United States Patent
Goto et al.

(10) Patent No.: US 10,472,290 B2
(45) Date of Patent: Nov. 12, 2019

(54) HONEYCOMB STRUCTURE AND PRODUCTION METHOD FOR SAID HONEYCOMB STRUCTURE

(71) Applicants: IBIDEN CO., LTD., Ogaki-shi (JP); TOYOTA JIDOSHA KABUSHIKI KAISHA, Toyota-shi (JP)

(72) Inventors: Shinnosuke Goto, Ibi-gun (JP); Kenta Nomura, Ibi-gun (JP); Takumi Tojo, Toyota (JP); Takeru Yoshida, Toyota (JP); Hiromasa Suzuki, Toyota (JP)

(73) Assignees: IBIDEN CO., LTD., Ogaki-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/245,257

(22) Filed: Jan. 11, 2019

(65) Prior Publication Data
US 2019/0144342 A1    May 16, 2019

Related U.S. Application Data

(63) Continuation of application No. PCT/JP2017/025478, filed on Jul. 13, 2017.

(30) Foreign Application Priority Data

Jul. 14, 2016  (JP) .................................. 2016-139685

(51) Int. Cl.
*F01N 3/28* (2006.01)
*C04B 38/00* (2006.01)
(Continued)

(52) U.S. Cl.
CPC .......... *C04B 38/0009* (2013.01); *B01D 53/94* (2013.01); *B01J 23/10* (2013.01);
(Continued)

(58) Field of Classification Search
CPC .......... B01D 53/94; B01J 37/04; C04B 35/10; C04B 38/00; C04B 2235/3229; F01N 3/2828
(Continued)

(56) References Cited

U.S. PATENT DOCUMENTS 7,250,385 B1 * 7/2007 Ohno .................... B01D 53/945
                                                    502/178
2001/0026838 A1 * 10/2001 Dettling .................... B01J 23/63
                                                    427/230
(Continued)

FOREIGN PATENT DOCUMENTS

EP    1852184     11/2007
JP    57-123820   8/1982
(Continued)

*Primary Examiner* — Tom P Duong
(74) *Attorney, Agent, or Firm* — Mori & Ward, LLP

(57) ABSTRACT

The present invention relates to a honeycomb structured body including a honeycomb fired body in which multiple through-holes are arranged longitudinally in parallel with one another with a partition wall therebetween, wherein the honeycomb fired body is an extrudate containing ceria-zirconia composite oxide particles and alumina particles, and when the pore size of the partition wall of the honeycomb fired body is measured by mercury porosimetry, and the measurement results are shown as a pore size distribution curve with pore size (μm) on the horizontal axis and log differential pore volume (ml) on the vertical axis, at least one peak is present in each of the pore size ranges of 0.01 to 0.1 μm and 0.1 to 5 μm.

20 Claims, 2 Drawing Sheets

(51) Int. Cl.

| | | |
|---|---|---|
| *B01J 37/04* | (2006.01) | |
| *B01J 37/08* | (2006.01) | |
| *B01J 37/32* | (2006.01) | |
| *B01J 23/10* | (2006.01) | |
| *B01J 23/63* | (2006.01) | |
| *B01D 53/94* | (2006.01) | |
| *B01J 32/00* | (2006.01) | |
| *B01J 35/04* | (2006.01) | |
| *B01J 35/10* | (2006.01) | |
| *C04B 35/488* | (2006.01) | |
| *C04B 35/10* | (2006.01) | |
| *C04B 35/119* | (2006.01) | |

(52) U.S. Cl.
CPC ............... *B01J 23/63* (2013.01); *B01J 32/00* (2013.01); *B01J 35/04* (2013.01); *B01J 35/10* (2013.01); *B01J 37/04* (2013.01); *B01J 37/08* (2013.01); *B01J 37/32* (2013.01); *C04B 35/10* (2013.01); *C04B 35/119* (2013.01); *C04B 35/488* (2013.01); *C04B 35/4885* (2013.01); *C04B 38/00* (2013.01); *C04B 38/007* (2013.01); *C04B 2235/3217* (2013.01); *C04B 2235/3218* (2013.01); *C04B 2235/3229* (2013.01); *C04B 2235/3244* (2013.01); *C04B 2235/5224* (2013.01); *C04B 2235/5436* (2013.01); *C04B 2235/5463* (2013.01); *C04B 2235/606* (2013.01); *C04B 2235/6021* (2013.01); *C04B 2235/6567* (2013.01); *C04B 2235/77* (2013.01); *F01N 2330/06* (2013.01); *F01N 2510/06* (2013.01)

(58) Field of Classification Search
USPC .............................. 422/180; 55/523; 428/116
See application file for complete search history.

(56) References Cited

U.S. PATENT DOCUMENTS

| | | | |
|---|---|---|---|
| 2003/0061860 A1* | 4/2003 | Hu | B01D 53/9454 73/23.31 |
| 2006/0292393 A1* | 12/2006 | Kunieda | B01J 35/04 428/688 |
| 2007/0204580 A1* | 9/2007 | Kunieda | B01D 39/2075 55/523 |
| 2008/0317999 A1* | 12/2008 | Patchett | B01D 53/9418 428/116 |
| 2009/0041645 A1* | 2/2009 | Wassermann | B01J 21/066 423/213.5 |
| 2009/0238733 A1* | 9/2009 | Ohno | B01D 46/2429 422/180 |
| 2009/0291839 A1* | 11/2009 | Kunieda | B01D 46/2429 502/74 |
| 2011/0107752 A1* | 5/2011 | Galligan | B01D 53/945 60/299 |

FOREIGN PATENT DOCUMENTS

| | | |
|---|---|---|
| JP | 2009-255047 | 11/2009 |
| JP | 2011-207749 | 10/2011 |
| JP | 2015-085241 | 5/2015 |
| WO | WO 2006/070540 | 7/2006 |
| WO | WO 2009/141874 | 11/2009 |

\* cited by examiner

HONEYCOMB STRUCTURE AND PRODUCTION METHOD FOR SAID HONEYCOMB STRUCTURE

TECHNICAL FIELD

The present invention relates to a honeycomb structured body and a method for producing the honeycomb structured body.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating a honeycomb-shaped monolithic substrate made of cordierite or the like with slurry containing noble metal particles having catalytic activity.

Meanwhile, Patent Literature 1 discloses an exhaust gas catalytic converter including a monolithic substrate containing ceria-zirconia composite oxide particles and θ-phase alumina particles, wherein a noble metal is supported on the monolithic substrate.

Patent Literature 2 discloses a honeycomb catalytic converter mainly containing zeolite, wherein the pore size distribution has a peak in each of the ranges of 0.006 to 0.06 µm and 0.06 to 1 µm.

CITATION LIST

Patent Literature

Patent Literature 1: JP 2015-85241 A
Patent Literature 2: WO 2009/141874

SUMMARY OF INVENTION

Technical Problem

In the exhaust gas catalytic converter disclosed in Patent Literature 1, the monolithic substrate does not contain cordierite as its material but contains a material that serves as a catalyst carrier and as a co-catalyst. Thus, the monolithic substrate has a low bulk density, and is easily heated. This is considered to contribute to improving warm-up performance of the catalytic converter. However, in Patent Literature 1, the cell walls do not contain pores of a specific size that allows sufficient diffusion of exhaust gas. Thus, the exhaust gas catalytic converter cannot be used as an exhaust gas catalytic converter with sufficiently high conversion performance.

The honeycomb catalytic converter disclosed in Patent Literature 2 has a specific pore distribution, and thus can be used as a honeycomb catalytic converter with high conversion performance. Attempts were made to obtain a honeycomb catalytic converter having a pore structure as described in Patent Literature 2 using the honeycomb catalytic converter disclosed in Patent Literature 1. However, since the honeycomb catalytic converter disclosed in Patent Literature 1 contains two kinds of particles, i.e., ceria-zirconia composite oxide particles and θ-phase alumina particles, unlike the honeycomb catalytic converter disclosed in Patent Literature 2 which contains only zeolite particles, it was difficult to form the pore structure as described above. Even when pores having a certain degree of pore size were formed, it was difficult to increase the volume percentage of micropores, so that it was difficult to achieve a honeycomb catalytic converter with sufficient exhaust gas conversion performance.

The present invention has been made to solve the above problem, and aims to provide a honeycomb structured body and a method for producing the honeycomb structured body, in which the pore size distribution can be controlled even when the honeycomb structured body contains multiple types of particles in combination and in which exhaust gas can be diffused into: partition walls to increase the contact between the exhaust gas and a supported catalyst, thus achieving high exhaust gas conversion performance.

Solution to Problem

The honeycomb structured body of the present invention to achieve the above object is a honeycomb structured body including a honeycomb fired body in which multiple through-holes are arranged longitudinally in parallel with one another with a partition wall therebetween, wherein the honeycomb fired body is an extrudate containing ceria-zirconia composite oxide particles and alumina particles, and when the pore size of the partition wall of the honeycomb fired body is measured by mercury porosimetry, and the measurement results are shown as a pore size distribution curve with pore size (µm) on the horizontal axis and log differential pore volume (ml) on the vertical axis, at least one peak is present in each of the pore size ranges of 0.01 to 0.1 µm and 0.1 to 5 µm.

Herein, a pore having a size in the range of 0.01 to 0.1 µm is defined as a "micropore", and a pore having a size in the range of 0.1 to 5 µm is defined as a "macropore".

In the honeycomb structured body, the honeycomb fired body is an extrudate containing ceria-zirconia composite oxide particles and alumina particles. Thus, the honeycomb fired body has a smaller heat capacity and can improve warm-up performance, as compared to a honeycomb fired body made of cordierite.

The term "warm-up performance" of a catalytic converter as used herein refers to the period of time required for the catalytic converter to exhibit sufficient exhaust gas conversion performance after the engine has started. The warm-up performance is considered to be excellent when the catalytic converter can exhibit sufficient exhaust gas conversion performance within a short period of time after the engine has started.

In addition, when the honeycomb structured body is used as a honeycomb catalytic converter with a noble metal or the like supported on the honeycomb fired body, first of all, since the honeycomb structured body contains macropores having a peak in the pore size range of 0.1 to 5 µm, surrounding exhaust gas easily diffuses into the pores, i.e., into the partition walls.

Secondly, since the honeycomb structured body also contains micropores having a peak in the pore size range of 0.01 to 0.1 µm, many irregularities attributable to the micropores are formed inside the macropores. Thus, the surface on which the noble metal as a catalyst is supported has a larger surface area, which increases the contact between the noble metal and the exhaust gas in the pores. Thus, the honeycomb catalytic converter that uses the honeycomb structured body of the present invention achieves high conversion performance.

In the honeycomb structured body of the present invention, the volume of pores having a size of 0.1 μm or less is preferably 50% by volume or more relative to the total pore volume.

The honeycomb structured body in which the volume percentage of micropores having a size of 0.1 μm or less is 50% by volume or more relative to the total pore volume has a larger surface area. Such a honeycomb structured body achieves higher conversion performance when used as a honeycomb catalytic converter.

In the honeycomb structured body of the present invention, the volume of pores having a size of 0.1 μm or less is more preferably 70% by volume or more relative to the total pore volume.

The honeycomb structured body in which the volume percentage of micropores having a size of 0.1 μm or less is 70% by volume or more relative to the total pore volume has a larger surface area. Such a honeycomb structured body achieves higher conversion performance when used as a honeycomb catalytic converter.

Yet, the volume of pores having a size of 0.1 μm or less is preferably 80% by volume or less relative to the total pore volume.

It is because if the volume of micropores having a size of 0.1 μm or less is more than 80% by volume relative to the total pore volume, the percentage of the macropores is low, so that exhaust gas cannot easily diffuse into the partition walls of the honeycomb structured body.

In the honeycomb structured body of the present invention, the honeycomb fired body preferably has a porosity of 55 to 70%.

The honeycomb structured body in which the honeycomb fired body has a porosity of 55 to 70% has a larger surface area because most pores are open pores, which allows easier diffusion of surrounding exhaust gas into the pores. Such a honeycomb structured body achieves higher conversion performance when used as a honeycomb catalytic converter.

The pore size and porosity can be measured by mercury porosimetry with a contact angle of 130° and a surface tension of 485 mN/m.

If the honeycomb fired body has a porosity lower than 55%, the percentage of closed pores is high, which makes it difficult to increase the surface area of the honeycomb structured body and thus to improve the conversion performance. In contrast, if the honeycomb fired body has a porosity higher than 70%, the porosity is so high that the honeycomb structured body has poor mechanical characteristics, and the honeycomb structured body is susceptible to problems such as cracks and breakage during use.

In the honeycomb structured body of the present invention, the alumina particles are preferably θ-phase alumina particles. The honeycomb structured body in which the alumina particles are θ-phase alumina particles can have a higher percentage of 3D net-like pores of a macropore size and can also have a higher percentage of the micropores. Such a honeycomb structured body achieves high conversion performance when used as a honeycomb catalytic converter. In addition, with the use of the θ-phase alumina particles, it is possible to prevent phase change of the alumina in exhaust gas and achieve higher heat resistance.

In the honeycomb structured body of the present invention, a noble metal is preferably supported on the honeycomb fired body.

The honeycomb structured body in which a noble metal that functions as a catalyst is supported on the honeycomb fired body can be used as a honeycomb catalytic converter for exhaust gas conversion.

The method for producing a honeycomb structured body of the present invention is a method for producing a honeycomb structured body including a honeycomb fired body in which multiple through-holes are arranged longitudinally in parallel with one another with a partition wall therebetween, the method including a molding step of molding a raw material paste containing ceria-zirconia composite oxide particles and alumina particles into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step into a honeycomb fired body, wherein the alumina particles for use in preparation of the raw material paste have an average particle size of 1 to 5 μm, a cumulative particle size distribution D10 of 0.5 to 2 μm, and a cumulative particle size distribution D90 of 2 to 10 μm, the ceria-zirconia composite oxide particles have an average particle size of 1 to 5 μm, a cumulative particle size distribution D10 of 0.5 to 2 μm, and a cumulative particle size distribution D90 of 2 to 10 μm, and the alumina particles have an average particle size larger than the average particle size of the ceria-zirconia composite oxide particles.

According to the method for producing a honeycomb structured body, the particle sizes and particle size distributions of the alumina particles and the ceria-zirconia composite oxide particles which are used as raw materials are adjusted as described above. Thus, the method can produce a honeycomb structured body in which the macropores and the micropores are distributed in a balanced manner and which exhibits excellent conversion performance when it is used as a honeycomb catalytic converter.

According to the method for producing a honeycomb structured body of the present invention, the honeycomb molded body obtained in the molding step is preferably freeze-dried in the drying step.

According to the method for producing a honeycomb structured body, freeze-drying of the honeycomb molded body allows a large amount of the water in the raw material paste to sublimate directly from the frozen state. Thus, the macropores can be easily formed, and it is possible to increase the size of the macropores. Thus, the method can produce a honeycomb structured body in which surrounding exhaust gas easily diffuses into the pores and which exhibits higher conversion performance when it is used as a honeycomb catalytic converter.

In the method for producing a honeycomb structured body of the present invention, the weight ratio of the ceria-zirconia composite oxide particles to the alumina particles (ceria-zirconia composite oxide particles/alumina particles) used in preparation of the raw material paste is preferably 1.0 to 3.0.

In the method for producing a honeycomb structured body, the ceria-zirconia composite oxide particle content is high when the weight ratio (ceria-zirconia composite oxide particles/alumina particles) is 1.0 to 3.0, and the ceria-zirconia composite oxide particles are used as co-catalysts. Thus, the ceria-zirconia composite oxide particles can enhance the action of a catalyst supported, and can further improve the performance of the honeycomb structured body as a honeycomb catalytic converter.

The method for producing a honeycomb structured body of the present invention preferably further includes a supporting step of allowing a noble metal to be supported on the honeycomb fired body.

According to the method for producing a honeycomb structured body, the honeycomb structured body can be used as a honeycomb catalytic converter for exhaust gas conversion with a noble metal supported on the honeycomb fired body.

DESCRIPTION OF EMBODIMENTS (Honeycomb Structured Body)

First, the honeycomb structured body of the present invention is described.

The honeycomb structured body of the present invention includes a honeycomb fired body in which multiple through-holes are arranged longitudinally in parallel with one another with a partition wall therebetween.

In the honeycomb structured body of the present invention, the honeycomb fired body is in the form of an extrudate containing ceria-zirconia composite oxide particles (hereinafter referred to as "CZ particles") and alumina particles. As described later, the honeycomb fired body is produced by extrusion-molding a raw material paste containing the CZ particles, the alumina particles, and an inorganic binder into an extrudate, and firing the extrudate.

Whether or not the honeycomb structured body of the present invention contains the above-described components can be confirmed by X-ray diffraction (XRD).

The honeycomb structured body of the present invention may include a single honeycomb fired body or multiple honeycomb fired bodies. The multiple honeycomb fired bodies may be combined together with an adhesive layer therebetween.

In the honeycomb structured body of the present invention, a peripheral coat layer may be formed on the outer periphery of the honeycomb fired body.

Figure 1:
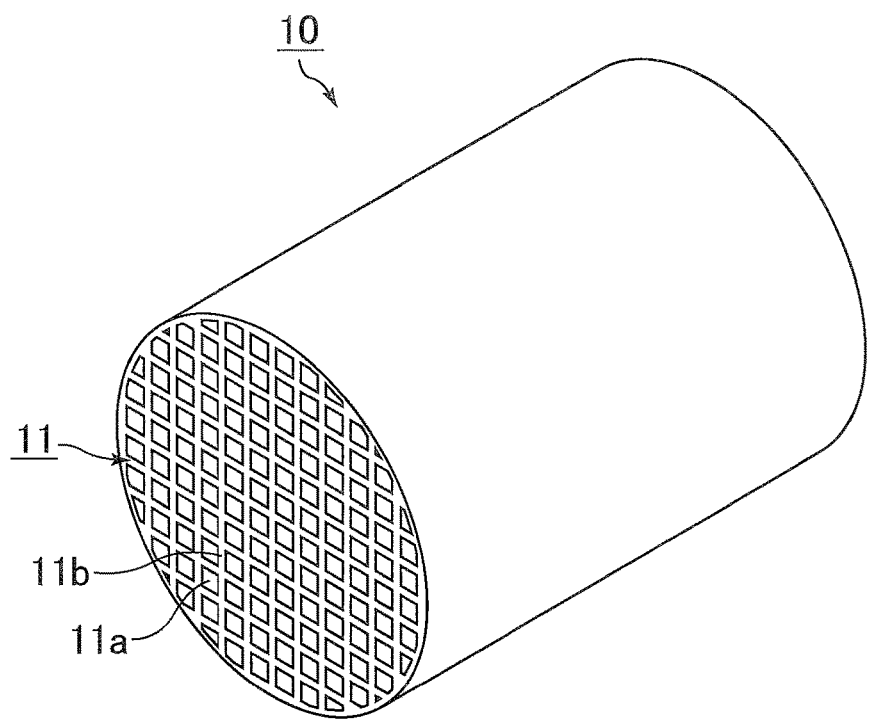
FIG. 1 is a perspective view schematically showing an exemplary honeycomb structured body of the present invention.

FIG. 1 is a perspective view schematically showing an exemplary honeycomb structured body of the present invention.

A honeycomb structured body 10 shown in FIG. 1 includes a single honeycomb fired body 11 in which multiple through-holes 11a are arranged longitudinally in parallel with one another with a partition wall 11b therebetween. The honeycomb fired body 11 contains CZ particles and alumina particles, and is in the form of an extrudate.

In the honeycomb structured body of the present invention, when the pore size of the partition wall of the honeycomb fired body is measured by mercury porosimetry, and the measurement results are shown as a pore size distribution curve with pore size (μm) on the horizontal axis and log differential pore volume (ml) on the vertical axis, at least one peak is present in each of the pore size ranges of 0.01 to 0.1 μm and 0.1 to 5 μm.

The number of peaks present in the range of 0.01 to 0.1 μm is not particularly limited, but is preferably 1. The number of peaks present in the range of 0.1 to 5 μm is not particularly limited, but is preferably 1.

Figure 2:
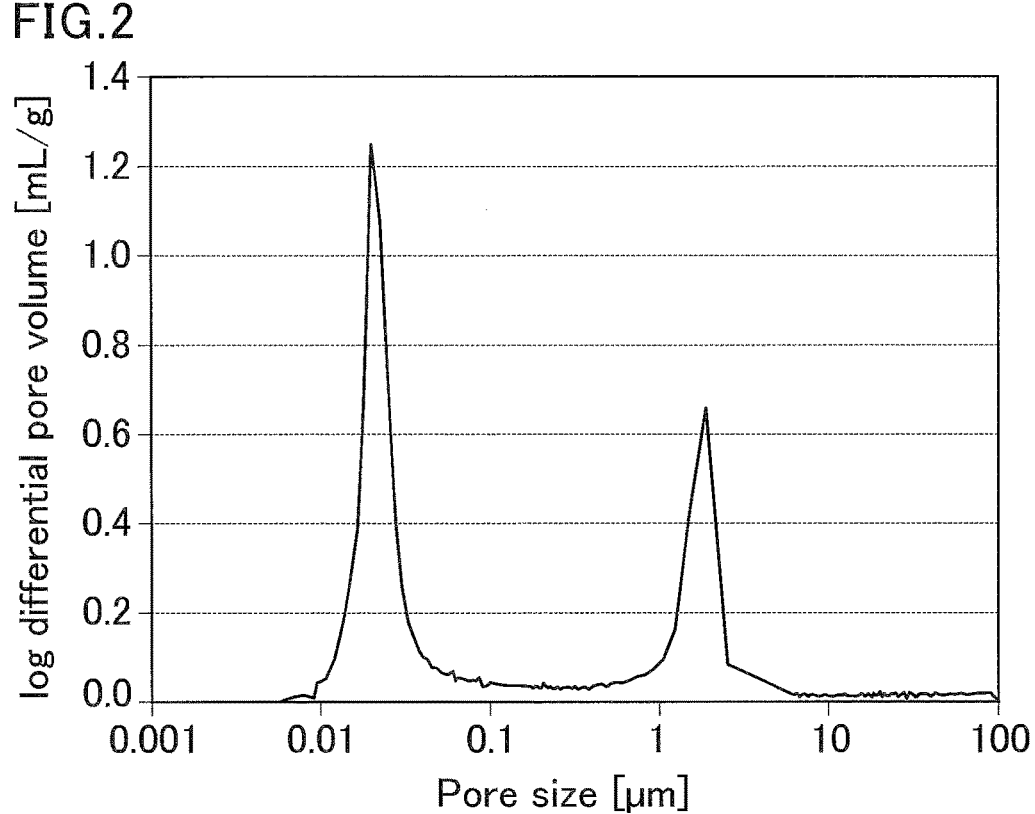
FIG. 2 is a graph showing results of pore size measurement by mercury porosimetry performed on an exemplary honeycomb structured body of the present invention (results in Example 2).

FIG. 2 is a graph showing results of pore size measurement by mercury porosimetry performed on an exemplary honeycomb structured body of the present invention (results in Example 2). The graph shown in FIG. 2 shows the log differential pore volume (mL/g) on the vertical axis, and the pore size (μm) on the horizontal axis. The "Pore diameter" in FIG. 2 means the same as the pore size.

The pore size distribution can be measured by mercury porosimetry with a contact angle of 130° and a surface tension of 485 mN/m.

As shown in FIG. 2, in this graph, a peak is present in each of the pore size ranges of 0.01 to 0.1 μm and 0.1 to 5 μm.

In the present invention, the volume of the micropores having a size of 0.1 μm or less is preferably 50% by volume or more relative to the total pore volume. In the graph shown in FIG. 2, the volume of the micropores is indeed 50% by volume or more relative to the total pore volume.

First of all, since the honeycomb structured body of the present invention contains macropores having a peak in the pore size range of 0.1 to 5 μm, surrounding exhaust gas easily diffuses into the partition walls of the honeycomb structured body when it is used as a honeycomb catalytic converter with a noble metal or the like supported on the honeycomb fired body.

Secondly, since the honeycomb structured body also contains micropores having a peak in the pore size range of 0.01 to 0.1 μm, many irregularities attributable to the micropores are formed inside the macropores. Thus, the surface on which the noble metal as a catalyst is supported has a larger surface area, which increases the contact between the noble metal and the exhaust gas in the pores. Thus, the honeycomb catalytic converter that uses the honeycomb structured body of the present invention achieves high conversion performance.

In the honeycomb structured body of the present invention, in order to further increase the surface area, the volume of pores having a size of 0.1 μm or less is preferably 70% by volume or more relative to the total pore volume.

Yet, the volume of pores having a size of 0.1 μm or less is preferably 80% by volume or less relative to the total pore volume. It is because if the volume of pores having a size of 0.1 μm or less is more than 80% by volume relative to the total pore volume, the percentage of the macropores is low, and exhaust gas thus cannot easily diffuse into the partition walls of the honeycomb structured body.

In the honeycomb structured body of the present invention, the honeycomb fired body preferably has a porosity of 55 to 70%.

The honeycomb structured body in which the honeycomb fired body has a porosity of 55 to 70% has a larger surface area because most pores are open pores, which allows easier diffusion of surrounding exhaust gas into the pores. Such a honeycomb structured body achieves higher conversion performance when used as a honeycomb catalytic converter.

As in the case of pore size, the porosity can also be measured by mercury porosimetry, with a contact angle of 130° and a surface tension of 485 mN/m.

If the honeycomb fired body has a porosity lower than 55%, the percentage of closed pores is high, which makes it difficult to increase the surface area of the honeycomb structured body and thus to improve the conversion performance. In contrast, if the honeycomb fired body has a porosity higher than 70%, the porosity is so high that the honeycomb structured body has poor mechanical characteristics, and the honeycomb structured body is susceptible to problems such as cracks and breakage during use.

In the honeycomb structured body of the present invention, in order to reduce the temperature distribution of the honeycomb structured body when heated, the ratio of length to diameter (length/diameter) of the honeycomb structured body is preferably 0.5 to 0.9, and the diameter of the honeycomb structured body is preferably 130 mm or less.

In the honeycomb structured body of the present invention, the CZ particles constituting the honeycomb fired body preferably has an average particle size of 1 to 10 µm. Preferably, the CZ particles include cracked particles.

The CZ particles are particles having a high coefficient of thermal expansion. When the CZ particles have an average particle size of 1 to 10 µm and have cracks in the particles, thermal expansion or thermal contraction of the CZ particles can be absorbed by the cracks in the particles. As a result, thermal shock damage to the entire honeycomb structured body can be prevented, resulting in a honeycomb structured body having high thermal shock resistance.

The average particle sizes of the CZ particles and the alumina particles constituting the honeycomb fired body can be determined by taking an SEM image of the honeycomb fired body with a scanning electron microscope (SEM "S-4800" available from Hitachi High-Technologies Corporation).

Whether or not the CZ particles include cracked particles can be confirmed by observation of an electron microscope image of the honeycomb fired body. In the electron microscope image of the honeycomb fired body, if a crack is found in three or more out of ten ceria-zirconia composite oxide particles, it is determined that the CZ particles include cracked particles.

The alumina particles constituting the honeycomb structured body of the present invention are preferably θ-phase alumina particles (θ-alumina particles).

The honeycomb structured body in which the alumina particles are θ-phase alumina particles can have a higher percentage of 3D net-like pores of a macropore size and can also have a higher percentage of the micropores. Such a honeycomb structured body achieves high conversion performance when used as a honeycomb catalytic converter. In addition, with the use of the θ-phase alumina particles, it is possible to prevent phase change of the alumina in exhaust gas and achieve higher heat resistance.

In the honeycomb structured body of the present invention, the θ-alumina particle content is preferably 15 to 35% by weight.

In the honeycomb structured body of the present invention, the CZ particle content is preferably 35 to 65% by weight.

The honeycomb structured body of the present invention preferably contains γ-alumina used as a binder during production, and preferably further contains α-alumina fibers.

It is because when a binder, which is required during production of the honeycomb structured body, is boehmite, a large part thereof is turned into γ-alumina by firing. Also, it is because the presence of the α-alumina fibers can improve the mechanical characteristics of the honeycomb structured body.

The γ-alumina content is preferably 10 to 20% by weight. The α-alumina fiber content is preferably 5 to 15% by weight.

The shape of the honeycomb structured body of the present invention is not limited to a round pillar shape. Examples of the shape include a rectangular pillar shape, a cylindroid shape, a pillar shape with a racetrack end face, and a rectangular pillar shape with rounded corners (e.g., a triangular pillar shape with rounded corners).

In the honeycomb structured body of the present invention, the shape of the through-holes of the honeycomb fired body is not limited to a quadrangular pillar shape. For example, it may be a triangular pillar shape or a hexagonal pillar shape.

In the honeycomb structured body of the present invention, the density of the through-holes in a cross section perpendicular to the longitudinal direction of the honeycomb fired body is preferably 31 to 155 pcs/cm$^2$.

In the honeycomb structured body of the present invention, the thickness of the partition wall of the honeycomb fired body is preferably 0.05 to 0.50 mm, more preferably 0.10 to 0.30 mm.

In the honeycomb structured body of the present invention, when a peripheral coat layer is formed on the outer periphery of the honeycomb fired body, the thickness of the peripheral coat layer is preferably 0.1 to 2.0 mm.

In the honeycomb structured body of the present invention, a noble metal is preferably supported on the honeycomb fired body.

The honeycomb structured body in which a noble metal that functions as a catalyst is supported on the honeycomb fired body can be used as a honeycomb catalytic converter for exhaust gas conversion.

The noble metal catalyst is preferably a catalyst for a three-way catalytic converter.

The three-way catalytic converter refers to a catalytic converter that mainly converts hydrocarbons (HC), carbon monoxide (CO), and nitrogen oxides (NOx). Examples of the noble metal that is used in the three-way catalytic converter include noble metals such as platinum, palladium, and rhodium.

In the honeycomb structured body of the present invention, the amount of the noble metal supported is preferably 0.1 to 15 g/L, more preferably 0.5 to 10 g/L.

The term "amount of the noble metal supported" as used herein refers to the weight of the noble metal per apparent volume of the honeycomb structured body. The apparent volume of the honeycomb structured body includes the pore volumes. It includes the volume of the peripheral coat layer and/or the volume of an adhesive layer.

(Method for Producing Honeycomb Structured Body)

Next, the method for producing a honeycomb structured body of the present invention is described.

The method for producing a honeycomb structured body of the present invention is a method for producing a honeycomb structured body including a honeycomb fired body in which multiple through-holes are arranged longitudinally in parallel with one another with a partition wall therebetween, the method including:

a molding step of molding a raw material paste containing CZ particles and alumina particles into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step into a honeycomb fired body, wherein the alumina particles for use in preparation of the raw material paste have an average particle size of 1 to 5 µm, a cumulative particle size distribution D10 of 0.5 to 2 µm, and a cumulative particle size distribution D90 of 2 to 10 μm, the CZ particles have an average particle size of 1 to 5 μm, a cumulative particle size distribution D10 of 0.5 to 2 μm, and a cumulative particle size distribution D90 of 2 to 10 μm, and the alumina particles have an average particle size larger than the average particle size of the CZ particles.

(Molding Step)

First, the method for producing a honeycomb structured body of the present invention includes a molding step of molding a raw material paste containing CZ particles and alumina particles into a honeycomb molded body in which multiple through-holes are arranged longitudinally in parallel with one another with a partition wall therebetween.

In, the molding step, first, a raw material paste containing CZ particles and alumina particles is prepared.

Alumina particles having an average particle size of 1 to 5 μm, a cumulative particle size distribution D10 of 0.5 to 2 μm, and a cumulative particle size distribution D90 of 2 to 10 μm are used.

CZ particles having an average particle size of 1 to 5 μm, a cumulative particle size distribution D10 of 0.5 to 2 μm, and a cumulative particle size distribution D90 of 2 to 10 μm are used.

Further, the alumina particles to be used are required to have an average particle size larger than the average particle size of the CZ particles.

The average particle sizes, D10, and D90 of the alumina particles and the CZ particles can be measured using a laser diffraction particle size distribution meter (Mastersizer 2000 available from Malvern Panalytical).

With use of the alumina particles having the characteristic particle size as described above and the CZ particles having the characteristic particle size as described above, it is possible to produce a honeycomb fired body having the above-described characteristics. In other words, it is possible to produce a honeycomb fired body in which when the pore size of the partition wall of the honeycomb fired body is measured by mercury porosimetry, and the measurement results are shown as a pore size distribution curve with pore size (μm) on the horizontal axis and log differential pore volume (ml) on the vertical axis, at least one peak is present in each of the pore size ranges of 0.01 to 0.1 μm and 0.1 to 5 μm. [0063]

Here, D10 regarding the cumulative particle size distribution refers to the particle size at which, 10% of the particles are smaller on the volume-based cumulative particle size distribution. D90 refers to the particle size at which 90% of the particles are smaller on the volume-based cumulative particle size distribution.

With the use of the CZ particles and the alumina particles having the above particle sizes and the above particle size distributions, it is possible to form the partition walls of the honeycomb structured body with such two types of particles having adequate particle size distributions being combined together, and it is thus possible to produce a honeycomb structured body in which the macropores and the micropores are distributed in a balanced manner and which exhibits excellent conversion performance when it is used as a honeycomb catalytic converter.

The alumina particles as the main component having the above characteristics are preferably θ-phase alumina particles.

Examples of other raw materials for use in preparation of the raw material paste include inorganic fibers, inorganic binders, organic binders, pore-forming agents, forming auxiliaries, and dispersion media.

Any material may be used for the inorganic fibers. Examples include alumina, silica, silicon carbide, silica alumina, glass, potassium titanate, and aluminum borate. Two or more of these may be used in combination. Among these, alumina fibers are preferred, and α-alumina fibers are particularly preferred.

The inorganic fibers preferably have an aspect ratio of 5 to 300, more preferably 10 to 200, still more preferably 10 to 100.

Any inorganic binder may be used. Examples include solids contained in materials such as alumina sol, silica sol, titania sol, sodium silicate, sepiolite, attapulgite, and boehmite. Two or more of these inorganic binders may be used in combination. Boehmite is preferred among these.

Boehmite is alumina monohydrate with the composition AlOOH, and has good dispersibility in media such as water. Thus, in the method for producing a honeycomb structured body of the present invention, boehmite is preferably used as the binder.

Any pore-forming agent may be used. Examples include acrylic resin, coke, and starch. In the present invention, use of two or more of acrylic resin, coke, and starch is preferred.

The pore-forming agent is an agent that is used to create pores in a fired body when producing the fired body.

Any organic binder may be used. Examples include methyl cellulose, carboxymethyl cellulose, hydroxyethyl cellulose, polyethylene glycol, phenolic resin, and epoxy resin. Two or more of these may be used in combination.

Any dispersion medium may be used. Examples include water and organic solvents such as benzene and alcohols such as methanol. Two or more of these may be used in combination.

Any forming auxiliary may be used. Examples include ethylene glycol, dextrins, fatty acids, fatty acid soaps, and polyalcohols. Two or more of these may be used in combination.

When the CZ particles, alumina particles, α-alumina fibers, and boehmite are used as the materials of the raw material paste, the percentage of each of these materials relative to the total solids remaining in the raw material paste after the firing step is preferably as follows: CZ particles: 40 to 60% by weight, alumina particles: 15 to 35% by weight, α-alumina fibers: 5 to 15% by weight, and boehmite: 10 to 20% by weight.

The weight ratio of the CZ particles to the alumina particles (CZ particles/alumina particles) is preferably 1.0 to 3.0.

The CZ particle content is high when the weight ratio (CZ particles/alumina particles) is 1.0 to 3.0, and the CZ particles are used as co-catalysts. Thus, the CZ particles can enhance the action of a catalyst supported, making it possible to further improve the performance of the honeycomb structured body as a honeycomb catalytic converter.

Preparation of the raw material paste preferably involves mixing/kneading. A device such as a mixer or an attritor may be used for mixing, and a device such as a kneader may be used for kneading.

In the method for producing a honeycomb structured body of the present invention, the raw material paste prepared by the above method is molded into a honeycomb molded body in which multiple through-holes are arranged longitudinally in parallel with one another with a partition wall therebetween. Specifically, the raw material paste is extrusion-molded into a honeycomb molded body.

Specifically, the raw material paste is passed through a die of a specific shape to form a continuous honeycomb molded body having through-holes of a specific shape, and the continuous honeycomb molded body is cut to a specific length, whereby a honeycomb molded body is obtained.
(Drying Step)

According to the method for producing a honeycomb structured body of the present invention, the honeycomb molded body obtained in the molding step is dried.

Here, preferably, a dryer such as a microwave dryer, a hot-air dryer, a dielectric dryer, a reduced-pressure dryer, a vacuum dryer, or a freeze-dryer is used to dry the honeycomb molded body into a honeycomb dried body. In particular, a freeze-drying method that uses a freeze-dryer is preferred. More preferably, freeze-drying involves pressure reduction after freezing the honeycomb molded body.

Preferred freezing conditions for freeze-drying are as follows: freezing a honeycomb molded body at −30° C. or lower for 1 to 48 hours; and subjecting the frozen honeycomb molded body to a reduced pressure of 1 to 600 Pa to sublimate the water under reduced pressure for 1 to 120 hours.

Freeze-drying of the honeycomb molded body allows a large amount of the water in the raw material paste to sublimate directly from the frozen state. Thus, the macropores can be easily formed, and it is possible to increase the size of the macropores. Thus, the method can produce a honeycomb structured body in which surrounding exhaust gas easily diffuses into the pores and which exhibits higher conversion performance when used as a honeycomb catalytic converter.

Herein, the honeycomb molded body before the firing step and the honeycomb dried body are also collectively referred to as a "honeycomb molded body".
(Firing Step)

In the method for producing a honeycomb structured body of the present invention, the honeycomb molded body dried in the drying step is fired in the firing step into a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not particularly limited, but an atmosphere with an oxygen concentration of 1 to 20% by volume is preferred.

The honeycomb structured body of the present invention can be produced by the above steps.
(Supporting Step)

The method for producing a honeycomb structured body of the present invention preferably further includes a supporting step of allowing a noble metal to be supported on the honeycomb fired body.

Examples of the method for allowing a noble metal to be supported on the honeycomb fired body include a method in which the honeycomb fired body or the honeycomb structured body is immersed in a solution containing noble metal particles or a noble metal complex, and the honeycomb fired body or the honeycomb structured body is then removed and heated.

When the honeycomb structured body includes a peripheral coat layer, a noble metal may be supported on the honeycomb fired body before the peripheral coat layer is formed, or a noble metal may be supported on the honeycomb fired body or the honeycomb structured body after the peripheral coat layer is formed.

In the method for producing a honeycomb structured body of the present invention, the amount of the noble metal supported in the supporting step is preferably 0.1 to 15 g/L, more preferably 0.5 to 10 g/L.
(Other Steps)

In the case where the method for producing a honeycomb structured body of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as the raw material paste can be used as the peripheral coat layer paste.

EXAMPLES

Examples that more specifically disclose the present invention are described below. The present invention is not limited to these examples.
(Preparation of Evaluation Sample)

Example 1

The following materials were mixed/kneaded to prepare a raw material paste: 5279 parts by weight of CZ particles (average particle size: 2 μm, D10: 1 μm, D90: 3 μm); 2640 parts by weight of θ-alumina particles (average particle size: 2.5 μm, D10: 0.8 μm, D90: 3.7 μm); 2262 parts by weight of boehmite as an inorganic binder; 1056 parts by weight of α-alumina fibers (average fiber diameter: 3 μm, average fiber length: 60 μm); 1060 parts by weight of methyl cellulose as an organic binder; 422 parts by weight of acrylic resin as a pore-forming agent; 528 parts by weight of coke also as a pore-forming agent; 845 parts by weight of polyoxyethylene oleyl ether (surfactant) as a forming auxiliary; and 5820 parts by weight of ion-exchanged water. The forming auxiliary has a viscosity at 30° C. of 50 mPa·s.

The raw material paste had a weight ratio (CZ particles/alumina particles) of 2.0.

The average particle sizes, D10, and D90 of the alumina particles and the CZ particles were measured using a laser diffraction particle size distribution meter (Mastersizer 2000 available from Malvern Panalytical).

Using an extruder, the raw material paste was extrusion-molded into a round pillar-shaped honeycomb molded body. Then, using a reduced-pressure microwave dryer, the honeycomb molded body was dried at an output of 1.74 kw under a reduced pressure of 6.7 kPa for 12 minutes, and then degreased/fired at 1100° C. for 10 hours, whereby a honeycomb fired body (honeycomb structured body) was produced. The honeycomb fired body had a round pillar shape with a diameter of 103 mm and a length of 80 mm in which the density of the through-holes was 77.5 pcs/cm$^2$ (500 cpsi) and the thickness of the partition wall was 0.127 mm (5 mil).

Example 2

A honeycomb fired body (honeycomb structured body) was produced as in Example 1, except that in drying, a freeze-dryer was used to freeze the honeycomb molded body at −50° C., the honeycomb molded body was then kept at 10 Pa for 72 hours to sublimate the water, and subsequently, the honeycomb molded body was degreased/fired at 1100° C. for 10 hours to produce a honeycomb fired body.

Comparative Example 1

A honeycomb fired body was produced as in Example 1, except that the following materials were mixed/kneaded to prepare a raw material paste: 5279 parts by weight of CZ particles (average particle size: 2 μm, D10: 0.4 μm, D90: 4.2 μm); 2640 parts by weight of θ-alumina particles (average particle size: 2 μm, D10: 0.3 μm, D90: 4.5 μm); 2262 parts by weight of boehmite as an inorganic binder; 1056 parts by weight of α-alumina fibers (average fiber diameter: 3 μm, average fiber length: 60 μm); 1060 parts by weight of methyl cellulose as an organic binder; 422 parts by weight of acrylic resin as a pore-forming agent; 528 parts by weight of coke also as a pore-forming agent; 1400 parts by weight of polyoxyethylene alkyl ether (surfactant) as a forming auxiliary; and 5340 parts by weight of ion-exchanged water. The forming auxiliary had a viscosity at 20° C. of 1200 mPa·s.

(Supporting Noble Metal)

A dinitrodiammine palladium nitrate solution ($[Pd(NH_3)_2(NO_2)_2]HNO_3$, palladium concentration: 100 g/L) and a rhodium nitrate solution ($[Rh(NO_3)_3]$, rhodium concentration: 50 g/L) were mixed at a volume ratio of 3:1 to prepare a mixed solution. The honeycomb fired bodies of Example 1, Example 2, and Comparative Example 1 produced by the above steps were immersed in this mixed solution and kept therein for 15 minutes. Subsequently, each honeycomb fired body was dried at 110° C. for two hours, and fired at 500° C. in a nitrogen atmosphere for one hour so as to allow palladium and rhodium catalysts to be supported on the honeycomb fired body.

The amount of the supported catalysts (i.e., the total amount of palladium and rhodium) was 0.14 g/L per apparent volume of the honeycomb fired body.

(Porosity and Pore Size Distribution Measurement)

The fired bodies produced in Examples 1 and 2 and Comparative Example 1 were measured for porosity and pore size distribution by mercury porosimetry.

The specific measurement procedure of mercury porosimetry was as follows: each honeycomb fired body was cut into a cubic with a side of about 0.8 cm, and each cubic was ultrasonically washed with ion-exchanged water and sufficiently dried to obtain a measurement sample. Next, each of these honeycomb fired body samples was measured for pore size by mercury porosimetry (in accordance with JIS R 1655: 2003). Specifically, the obtained samples were measured for pore size using an automated porosimeter "Micromeritics AutoPore III 9405" available from Shimadzu Corporation. Here, the measurement range was 0.006 to 500 μm. The porosity was measured at every pressure increment of 0.1 psia for the range of 100 μm to 500 μm, and at every pressure increment of 0.25 psia for the range of 0.006 μm to 100 μm. The porosity was measured with a contact angle of 130° and a surface tension of 485 mN/m. Further, the volume percentage (% by volume) of pores having a size of 0.1 μm or less relative to the total pore volume was calculated.

Figure 3:
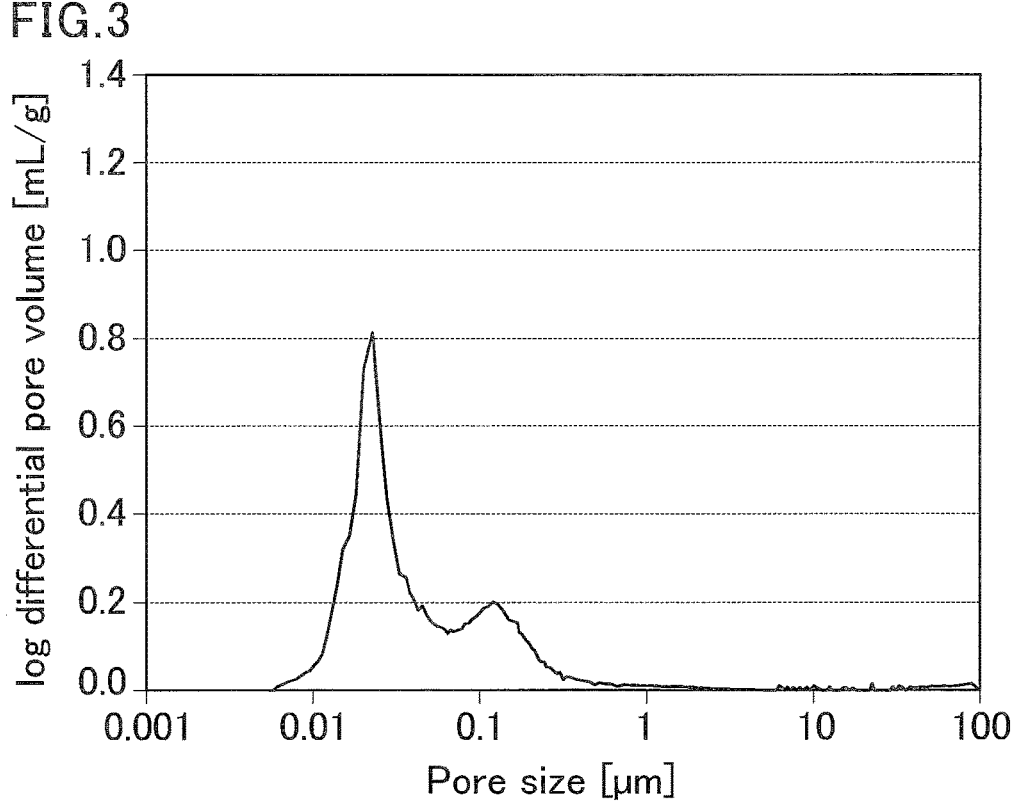
FIG. 3 is a graph showing results of pore size measurement by mercury porosimetry performed on an exemplary honeycomb structured body of the present invention (results in Example 1).
Figure 4:
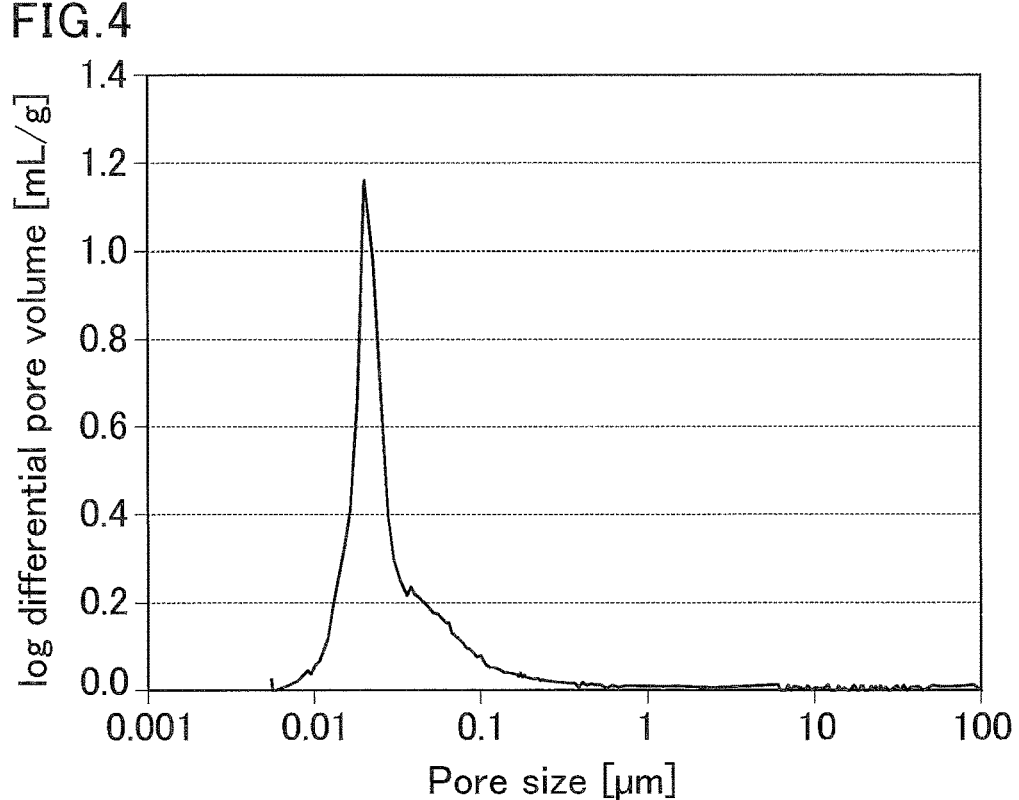
FIG. 4 is a graph showing results of pore size measurement by mercury porosimetry performed on a honeycomb structured body according to Comparative Example 1.

FIGS. 2 to 4 and Table 1 show the measurement results. In each of the graphs shown in FIG. 2 to FIG. 4, the vertical axis shows the log differential pore volume (ml), and the horizontal axis shows the pore size (μm). FIG. 2 shows the results of Example 2, FIG. 3 shows the results of Example 1, and FIG. 4 shows the results of Comparative Example 1. In Table 1, the volume percentage of pores having a size of 0.1 μm or less relative to the total pore volume is described as "Percentage of pores having a size of 0.1 μm or less (% by volume)". The "Pore diameter" in FIGS. 2 to 4 means the same as the pore size.

(Exhaust Gas Conversion Rate Measurement)

The honeycomb fired bodies produced in Examples 1 and 2 and Comparative Example 1 were cut into quadrangular pillar-shaped test pieces (side length: 27 mm, longitudinal length: 25 mm) using a diamond cutter. While simulant gas was introduced into these test pieces at a flow rate of 20 L/min, a space velocity (SV) of 68000/hr, and a temperature increase rate of 30° C./min, the outflow of HC (hydrocarbons) flowing out of the test pieces and the temperature upon outflow were measured using a catalyst evaluation device (Motor Exhaust Gas Analyzer MEXA-7000 available from Horiba, Ltd.).

Based on the data, the conversion rate (%) of HC expressed by following formula was calculated:

(HC inflow−HC outflow)/(HC inflow)×100.

Also, based on the temperature data, the temperature at which the conversion rate of THC reached 50% was measured. Table 1 shows the following results. In Table 1, the temperature is described as "HC conversion rate: temperature [° C.] at 50%". The components of the simulant gas are as follows: NO: 1200 ppm, $O_2$: 6460 ppm, CO: 9330 ppm, THC (total hydrocarbons): 1554 ppm, $CO_2$: 1%, $H_2O$: 0.3%, and nitrogen (balance).

TABLE 1

| | Percentge of pores having a size of 0.1 μm or less [% by volume] | Porosity [%] | HC conversion rate: temperature [° C.] at 50% |
|---|---|---|---|
| Example 1 | 78 | 61 | 250 |
| Example 2 | 55 | 65 | 230 |
| Comparative Example 2 | 90 | 59 | 340 |

According to the graphs of pore size distribution shown in FIGS. 2 and 3, the honeycomb fired bodies according to Examples 1 and 2 each show one peak in each of the pore size ranges of 0.01 to 0.1 μm and 0.1 to 5 μm. As shown in Table 1, the temperature at which the conversion rate reached 50% was 250° C. in Example 1, and 230° C. in Example 2.

In contrast, according to the pore size distribution graph shown in FIG. 4, the honeycomb fired body according to Comparative Example 1 does not have a peak in the range of 0.1 to 5 μm. The temperature at which the conversion rate reached 50% was 340° C. in Comparative Example 1, while the temperature at which the conversion rate reached 50% was lower than that in Examples 1 and 2. The fired bodies according to Examples 1 and 2 were found to exhibit excellent warm-up performance and excellent purification performance.

REFERENCE SIGNS LIST

10 honeycomb structured body
11 honeycomb fired body
11a through-hole
11b partition wall

The invention claimed is:
1. A honeycomb structured body comprising:
a honeycomb fired body in which multiple through-holes are arranged longitudinally in parallel with one another with a partition wall therebetween,
wherein the honeycomb fired body is an extrudate containing ceria-zirconia composite oxide particles and alumina particles, and
when the pore size of the partition wall of the honeycomb fired body is measured by mercury porosimetry, and the measurement results are shown as a pore size distribution curve with pore size (μm) on the horizontal axis and log differential pore volume (ml) on the vertical axis, at least one peak is present in each of the ranges of 0.01 to 0.1 μm and 0.1 to 5 μm.

2. The honeycomb structured body according to claim 1, wherein the volume of pores having a size of 0.1 μm or less is 50% by volume or more relative to the total pore volume.

3. The honeycomb structured body according to claim 2, wherein the volume of pores having a size of 0.1 μm or less is 70% by volume or more relative to the total pore volume.

4. The honeycomb structured body according to claim 3, wherein the honeycomb fired body has a porosity of 55 to 70%.

5. The honeycomb structured body according to claim 3, wherein the alumina particles are θ-phase alumina particles.

6. The honeycomb structured body according to claim 3, wherein a noble metal is supported on the honeycomb fired body.

7. The honeycomb structured body according to claim 2, wherein the honeycomb fired body has a porosity of 55 to 70%.

8. The honeycomb structured body according to claim 2, wherein the alumina particles are θ-phase alumina particles.

9. The honeycomb structured body according to claim 2, wherein a noble metal is supported on the honeycomb fired body.

10. The honeycomb structured body according to claim 1, wherein the honeycomb fired body has a porosity of 55 to 70%.

11. The honeycomb structured body according to claim 10, wherein the alumina particles are θ-phase alumina particles.

12. The honeycomb structured body according to claim 10, wherein a noble metal is supported on the honeycomb fired body.

13. The honeycomb structured body according to claim 1, wherein the alumina particles are θ-phase alumina particles.

14. The honeycomb structured body according to claim 13, wherein a noble metal is supported on the honeycomb fired body.

15. The honeycomb structured body according to claim 1, wherein a noble metal is supported on the honeycomb fired body.

16. A method for producing a honeycomb structured body comprising a honeycomb fired body in which multiple through-holes are arranged longitudinally in parallel with one another with a partition wall therebetween, the method comprising:

a molding step of molding a raw material paste containing ceria-zirconia composite oxide particles and alumina particles into a honeycomb molded body in which multiple through-holes are arranged longitudinally in parallel with one another with a partition wall therebetween;

a drying step of drying the honeycomb molded body obtained in the molding step; and a firing step of firing the honeycomb molded body dried in the drying step into a honeycomb fired body, wherein the alumina particles for use in preparation of the raw material paste have an average particle size of 1 to 5 μm, a cumulative particle size distribution D10 of 0.5 to 2 μm, and a cumulative particle size distribution D90 of 2 to 10 μm, the ceria-zirconia composite oxide particles have an average particle size of 1 to 5 μm, a cumulative particle size distribution D10 of 0.5 to 2 μm, and a cumulative particle size distribution D90 of 2 to 10 μm, and the alumina particles have an average particle size larger than the average particle size of the ceria-zirconia composite oxide particles.

17. The method for producing a honeycomb structured body according to claim 16, wherein in the drying step, the honeycomb molded body obtained in the molding step is freeze-dried.

18. The method for producing a honeycomb structured body according to claim 17, wherein the weight ratio of the ceria-zirconia composite oxide particles to the alumina particles (ceria-zirconia composite oxide particles/alumina particles) for use in preparation of the raw material paste is 1.0 to 3.0.

19. The method for producing a honeycomb structured body according to claim 16, wherein the weight ratio of the ceria-zirconia composite oxide particles to the alumina particles (ceria-zirconia composite oxide particles/alumina particles) for use in preparation of the raw material paste is 1.0 to 3.0.

20. The method for producing a honeycomb structured body according to claim 16, further comprising a supporting step of allowing a noble metal to be supported on the honeycomb fired body.

* * * * *